United States Patent
Olson, III et al.

(10) Patent No.: US 12,264,109 B1
(45) Date of Patent: Apr. 1, 2025

(54) CONTINUOUS MANUFACTURING OF CARBON FOAM STRUCTURES AT ATMOSPHERIC PRESSURE

(71) Applicant: CONSOL Innovations LLC, Triadelphia, WV (US)

(72) Inventors: Rudolph Andrew Olson, III, Triadelphia, WV (US); Douglas R. Amie, Adena, OH (US); Bruce M. Hines, Jacobsburg, OH (US); Brian H. Nichols, Weirton, WV (US); Tatianna Englebert, Woodland, CA (US)

(73) Assignee: CONSOL Innovations, LLC, Triadelphia, WV (US)

( * ) Notice: Subject to any disclaimer, the term of this patent is extended or adjusted under 35 U.S.C. 154(b) by 0 days.

(21) Appl. No.: 18/838,514

(22) PCT Filed: Feb. 13, 2023

(86) PCT No.: PCT/US2023/012887
§ 371 (c)(1),
(2) Date: Aug. 14, 2024

(87) PCT Pub. No.: WO2023/167778
PCT Pub. Date: Sep. 7, 2023

Related U.S. Application Data

(60) Provisional application No. 63/315,235, filed on Mar. 1, 2022.

(51) Int. Cl.
*C04B 35/532* (2006.01)
*C04B 35/634* (2006.01)
*C04B 38/10* (2006.01)

(52) U.S. Cl.
CPC ...... *C04B 35/532* (2013.01); *C04B 35/63496* (2013.01); *C04B 38/10* (2013.01);
(Continued)

(58) Field of Classification Search
CPC . C04B 35/532; C04B 35/63496; C04B 38/10; C04B 2235/6562; C04B 2235/6567
See application file for complete search history.

(56) References Cited

U.S. PATENT DOCUMENTS 6,544,491 B1  4/2003  Stiller et al.
6,656,239 B1 *  12/2003  Rogers ............... C04B 28/02
                                              44/628

(Continued)

FOREIGN PATENT DOCUMENTS

WO  WO 2021/231515  * 11/2021  ............. C04B 7/02
WO  WO 2021/231515 A1  11/2021

OTHER PUBLICATIONS

Calvo, et al., Carbon Foams from Different Coals, Energy & Fuels 2008; 22: 3376-3383 (Year: 2008).*

(Continued)

*Primary Examiner* — Daniel C. McCracken
(74) *Attorney, Agent, or Firm* — Kirk A. Wilson; Joseph T. Guy; Patent Filing Specialist Inc.

(57) ABSTRACT

A method of manufacturing essentially crack-free carbon foam structures and carbon foam structures made in single-piece flow through a continuous kiln under inert atmosphere at atmospheric pressure. This process greatly reduces the cost to manufacture by reducing manufacturing time and increasing the ability to integrate automation equipment.

10 Claims, 9 Drawing Sheets

(52) U.S. Cl.
CPC .......... *C04B 2235/6562* (2013.01); *C04B 2235/6567* (2013.01)

(56) References Cited

U.S. PATENT DOCUMENTS

| | | |
|---|---|---|
| 2006/0222854 A1 | 10/2006 | Matviya et al. |
| 2019/0308881 A1 | 10/2019 | Stiller et al. |
| 2021/0122640 A1 | 4/2021 | Stiller |

OTHER PUBLICATIONS

ISA/US; International Search Report and Written Opinion prepared for PCT/US2023/012887; Date mailed: May 3, 2023.
IPEA/US; International Preliminary Report on Patentability prepared for PCT/US2023/012887; Date mailed: Aug. 2, 2024.

\* cited by examiner

CONTINUOUS MANUFACTURING OF CARBON FOAM STRUCTURES AT ATMOSPHERIC PRESSURE

CROSS-REFERENCE TO RELATED APPLICATIONS

This patent application claims the benefit of Provisional Patent Application No. 63/315,235, filed on Mar. 1, 2022, the disclosure of which is incorporated by reference herein in its entirety.

STATEMENT REGARDING FEDERALLY SPONSORED RESEARCH

This invention was made with government support under DE-FE0031992 awarded by the Department of Energy. The government has certain rights in the invention.

FIELD OF THE DISCLOSURE

The present invention is directed to a method to manufacture carbon foam structures in single-piece flow through a continuous kiln under inert atmosphere at atmospheric pressure. This process can greatly reduce the cost to manufacture by reducing manufacturing time and increasing the ability to integrate automation equipment.

BACKGROUND OF THE DISCLOSURE

In a typical carbonaceous carbon foam manufacturing process, coal is heated in a nitrogen atmosphere so that it does not burn. The precursor first melts as it is heated, then evolves gases that cause the material to foam. The foaming step is typically done under high pressure (about 400 psi) to help regulate the rate at which the precursor transforms into liquid phase, forms bubbles, and reacts to form a solid foam, which enables the generation of high-quality foam. This foaming step is performed over a temperature range of about 25-470° C., during which oxygen and some hydrogen are eliminated. The foamed product is then fired in a kiln at atmospheric pressure under nitrogen to eliminate most of the remaining hydrogen and further crosslink the carbon until only vitreous carbon remains at 1000° C.

Manufacturing the carbonaceous carbon foam in an autoclave at high pressure is expensive, time consuming, capital intensive, and limited to a batch-type operation. In addition, the size of the product is limited to the size of the autoclave that is allowed by the process conditions, or of course the autoclave that a business can afford. The higher the pressure, the more expensive the autoclave and the more its size is limited by engineering constraints. As a result, the markets available to carbon foam have been limited and the market sizes have been small because the cost has remained high. In order to access a broader variety of larger markets, the cost of the current process must be reduced by enabling the manufacture of carbon foam at atmospheric pressure in a continuous fashion. This task has been difficult given the advantages provided by high pressure, which helps to regulate the reactions occurring within the coal as it is heated. When conducting carbon foam processing at atmospheric pressure, the reaction rates of the coal are changed, and it is more difficult to form an attractive crack-free carbon foam.

Thus, when one simply adds coal to a container and sends it through a continuous kiln using a thermal profile similar to that utilized in an autoclave, one does not produce a suitable essentially crack-free carbon foam. A typical carbon foam panel produced in an autoclave, as seen in FIG. 1, was processed at high pressure using only coal and is essentially crack-free; one may see some extraneous fissures on the surface of the raw bun emerging from the autoclave, but these are easily machined away to reveal a crack-free part. When one simply adds coal to a container and sends it through a continuous kiln using a thermal profile like that utilized in an autoclave, one does not produce the same attractive carbon foam part shown in FIG. 1. Even relatively small parts produced in this manner produced cracked and ugly products, as seen in FIGS. 2 and 3, where control samples were made using only coal mined from the Bailey mine near Graysville, Pennsylvania, United States. Both were processed in a continuous kiln applying the "good" thermal profile displayed in FIG. 4. The FIG. 3 sample was 8" in diameter, the FIG. 4 sample was 9.5"×12". Note that both samples contained large cracks 10. With these results, it was obvious that additional controls would be required to manufacture an essentially crack-free product.

BRIEF SUMMARY OF THE INVENTION

A continuous method for producing essentially crack-free carbon foam structures, comprising the steps of: pulverizing a carbonaceous starting material into a powder; blending the powder and at least one of a chemical or particulate additive to form a coal mixture; placing the coal mixture into a carbon foam structure mold configured for continuous processing in a kiln under inert gas at atmospheric pressure; heating the mold and coal mixture at a rate of about 6° F. per minute in a kiln temperature of about 700° F. under an inert gas; maintaining the kiln temperature at about 700° F. for a period of time for thermally processing the coal mixture; further heating the mold and coal mixture in a kiln with a temperature of about 900° F. until a carbon foam structure is formed; cooling the carbon foam structure at atmospheric conditions; and wherein the carbon foam structure is essentially crack-free.

An essentially crack-free carbon foam structure made by a continuous method, comprising the steps of: pulverizing a carbonaceous starting material into a powder; blending the powder and at least one of a chemical or particulate additive to form a coal mixture; placing the coal mixture into a carbon foam structure mold configured for continuous processing in a kiln under inert atmosphere at atmospheric pressure; heating the mold and coal mixture at a rate of about 6° F. per minute in a kiln temperature of about 700° F. under an inert gas; maintaining the kiln temperature at about 700° F. for a period of time for thermally processing the coal mixture; further heating mold and coal mixture in a kiln temperature of about 900° F. until a carbon foam structure is formed; cooling the carbon foam structure at atmospheric conditions; and wherein the carbon foam structure is essentially crack-free and has a compressive strength of about 1200 psi when normalized to about 40 pounds per cubic foot.

DETAILED DESCRIPTION OF THE INVENTION

Figure 1:
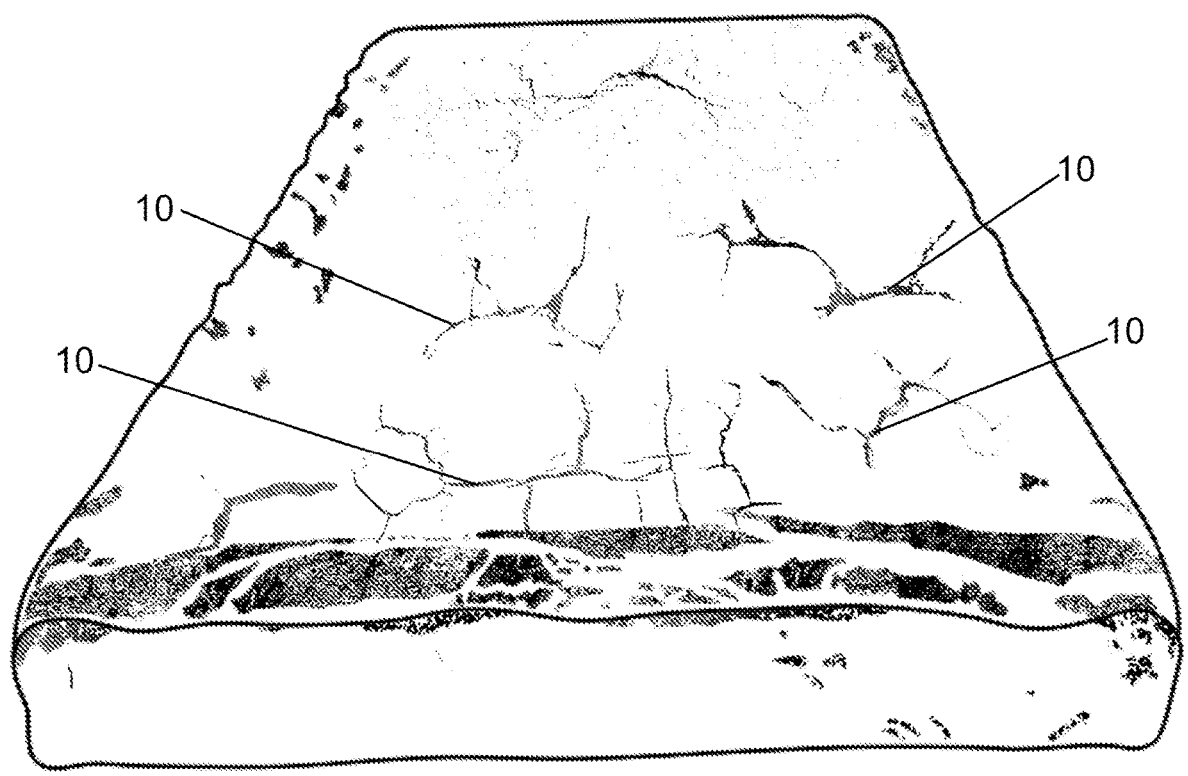
FIG. 1 is a rendering of a photograph showing a typical attractive carbon foam panel produced in autoclave at high pressure using only coal.
Figure 2:
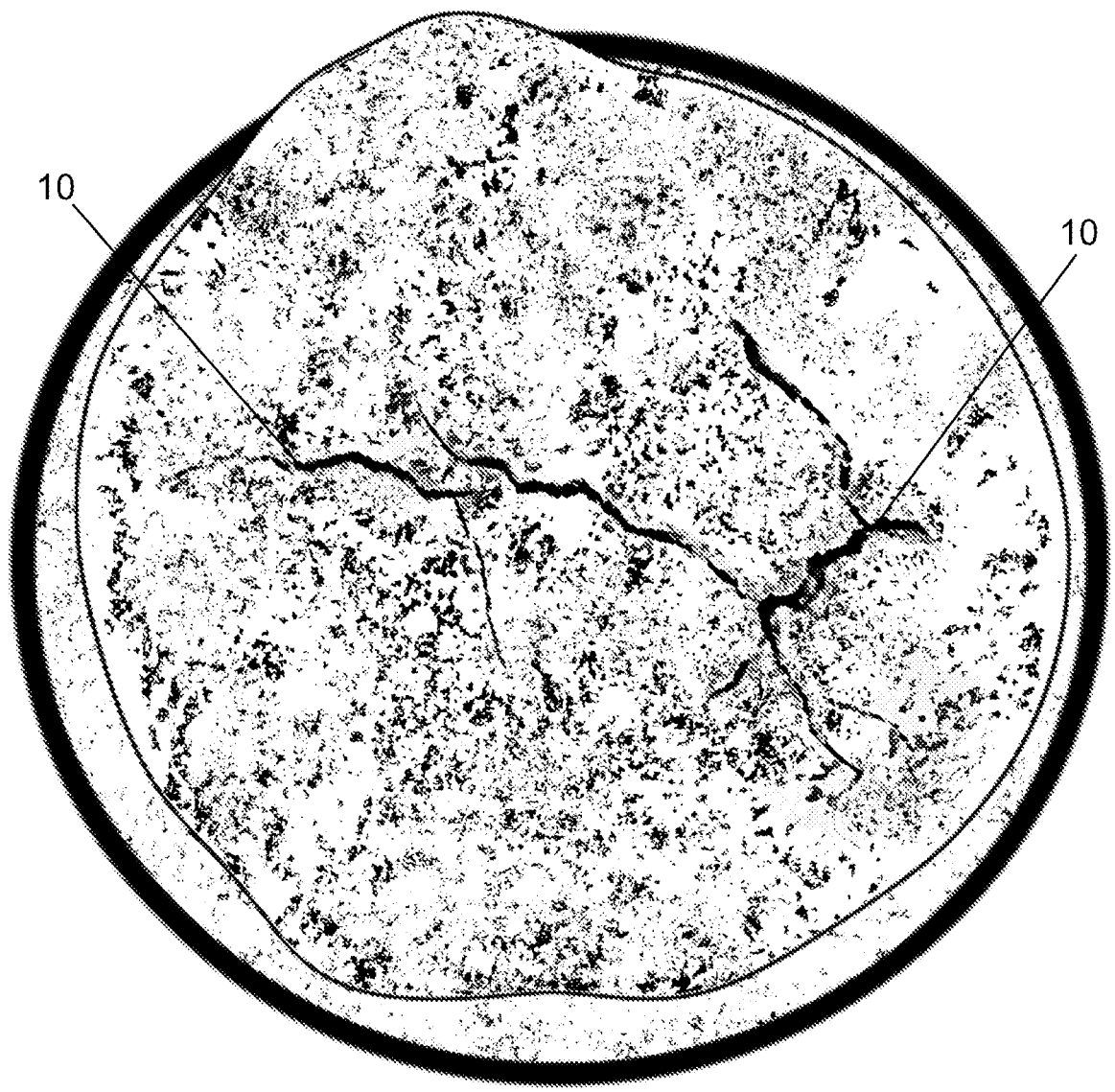
FIGS. 2 and 3 are renderings of photographs showing control samples made using only a high vol coal. Both were processed in a continuous kiln applying the "good" thermal profile displayed in FIG. 4.
Figure 3:
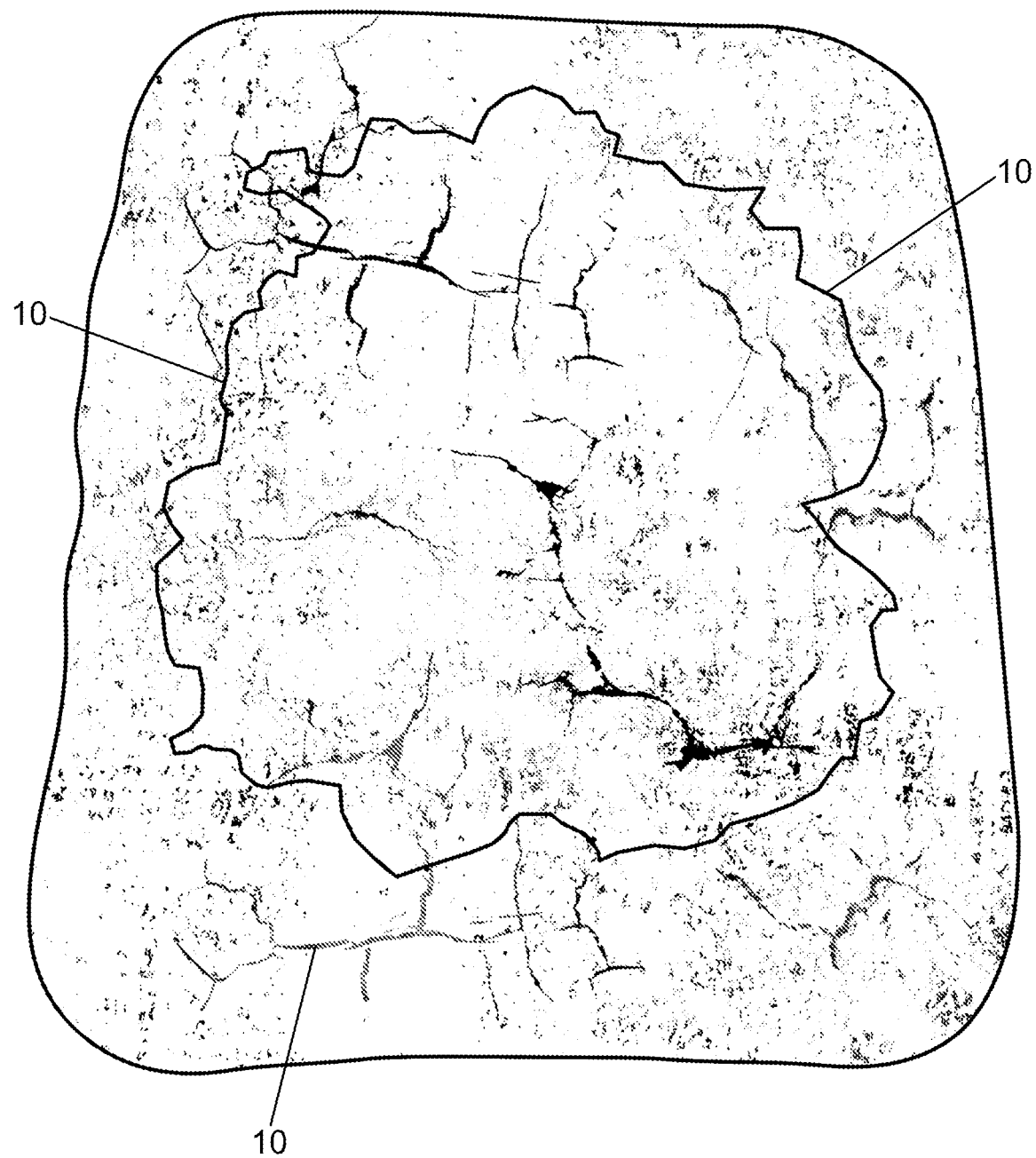

Some embodiments of the present invention are described in this section in detail sufficient for one skilled in the art to practice the present invention without undue experimentation. It is to be understood, however, that the fact that a limited number of preferred embodiments are described does not in any way limit the scope of the present invention as set forth in the claims.

It is to be understood that whenever a range of values is described herein, i.e. whether in this section or any other part of this patent document, the range includes the end points and every point there between as if each and every such point had been expressly described. Unless otherwise stated, the words "about" and "substantially" as used herein are to be construed as meaning the normal measuring and/or fabrication limitations related to the value or condition which the word "about" or "substantially" modifies. Unless expressly stated otherwise, the term "embodiment" is used herein to mean an embodiment of the present invention. The term "essentially crack-free" means a structure having no internal cracks or internal defects that may cause cracks when stress is applied to the structure.

A method to manufacture carbon foam structures in single-piece flow through a continuous kiln under inert atmosphere at atmospheric pressure is disclosed. This process can greatly reduce the cost to manufacture by reducing manufacturing time and increasing the ability to integrate automation equipment.

The carbonaceous starting material coal for these carbon foam structures may include bitumen, anthracite, or even lignite, or blends of these coals that exhibit a "free swell index" as determined by ASTM D720 of between about 3.5 and about 9.0, but are preferably bituminous, agglomerating coals that have been comminuted to an appropriate particle size, preferably to a fine powder passing through about 60 to 80 mesh. Additionally, according to further highly preferred embodiments of the present invention, the coal carbonaceous starting materials of the present invention possess all or at least some of the following characteristics: 1) a volatile matter content (dry, ash-free basis) of between about 35% and about 45% as defined by ASTM D3175, "Test Method for Volatile Matter in the Analysis of Coal and Coke"; 2) a fixed carbon (dry basis) between about 50% and about 60% as defined by ASTM D3172, "Practice for Proximate Analysis of Coal and Coke"; 3) a Gieseler initial softening temperature of between about 380° C. and about 400° C. as determined by ASTM D2639, Test Method for Plastic Properties of Coal by the Constant-Torque Gieseler Plastometer"; 4) a plastic temperature range above about 50° C. as determined by ASTM D2639; 5) a maximum fluidity of at least 300 ddpm (dial divisions per minute) and preferably greater than about 2000 ddpm as determined by ASTM D2639; 6) expansion greater than about 20% and preferably greater than about 100% as determined by Amu Dilatation; 7) vitrinite reflectance in the range of from about 0.80 to about 0.95 as determined by ASTM D2798, "Test Method for Microscopical Determination of the Reflectance of Vitrinite in Polished Specimens of Coal"; 8) less than about 30% inert maceral material such as semifusinite, micrinite, fusinite, and mineral matter as determined by ASTM D2798; and 9) no significant oxidation of the coal (0.0 vol % moderate or severe oxidation) as determined by ASTM D 2798 and non-maceral analysis. The low softening point (380-400° C.) is important so that the material softens and is plastic before volatilization and coking occur. The large plastic working range or "plastic range" is important in that it allows the coal to flow plastically while losing mass due to volatilization and coking. Vitrinite reflectance, fixed carbon content and volatile matter content are important in classifying these coal carbonaceous starting materials as "high-volatile" bituminous coals that provide optimum results in the process of the present invention.

The present invention can include introducing a particulate pore stabilizer to the carbonaceous starting material. The particulate pore stabilizer is a material that increases the stability of the bubbles formed during the foaming process and preferably help promote nucleation of bubbles throughout the volume of the foam instead of just at the sides and bottom of the carbon foam panel. In some embodiments, the particulate pore stabilizer preferably provides a wetting angle, or contact angle, between the particulate and the liquid phase of between about 50 degrees and about 105 degrees. The wetting (contact) angle is measured at the foam-bubble interface to better quantify wettability.

In some embodiments, the particulate pore stabilizer may include, but is not limited to, carbon black; oxides such as alumina, silica, kyanite, boric acid and titania; ceramics such as silicon carbide, aluminosilicate clay, and fine metal powders. Preferably, the particulate pore stabilizer does not have a significant detrimental impact on the resultant properties of the carbon foam. Alternatively, the particulate pore stabilizer may be selected to add or tailor a property for the carbon foam. In some embodiments, the particular pore stabilizer is able to withstand the thermal treatment temperatures during the carbon foam making process without melting or otherwise decomposing. Further combinations or mixtures of different particulate pore stabilizers may be used.

The particulate pore stabilizer may be added in amounts ranging from about 0.1% to about 10% by weight. In certain embodiments, the particulate pore stabilizer may be added in amounts less than about 1% by weight. In some embodiments, the majority of the particle sizes in the particulate pore stabilizer are preferably less than 10 km. Preferably, the particle sizes are less than about 5 km. In some embodiments, the particle sizes in the particulate pore stabilizer may range from about 3 to about 4 km.

Also, several chemical or particulate additives were employed to alleviate some of the processing problems in making carbon foam structures using continuous processing. These were used in concert with changes in the thermal profile to tune the process and enable the manufacture of acceptable carbon foam panels. Some of the chemical or particulate additives that had a positive impact included:

Polyethylene—this material likely adds liquid phase.

Polyethylene oxide—this material likely helps to absorb low viscosity fluids that are emitted from the coal and retain a thicker viscosity for the liquid phase that is formed.

Phenolic resin—this material likely adds liquid phase, and also reacts easily to form a solid and carbonizes at high temperature.

Microcrystalline cellulose—this material likely helps to stabilize bubbles in the foam and also carbonize at high temperature.

Graphite—this material likely helps to stabilize bubbles in the foam and lessens the thermal gradient across the foam by increasing its thermal conductivity.

Figure 4:
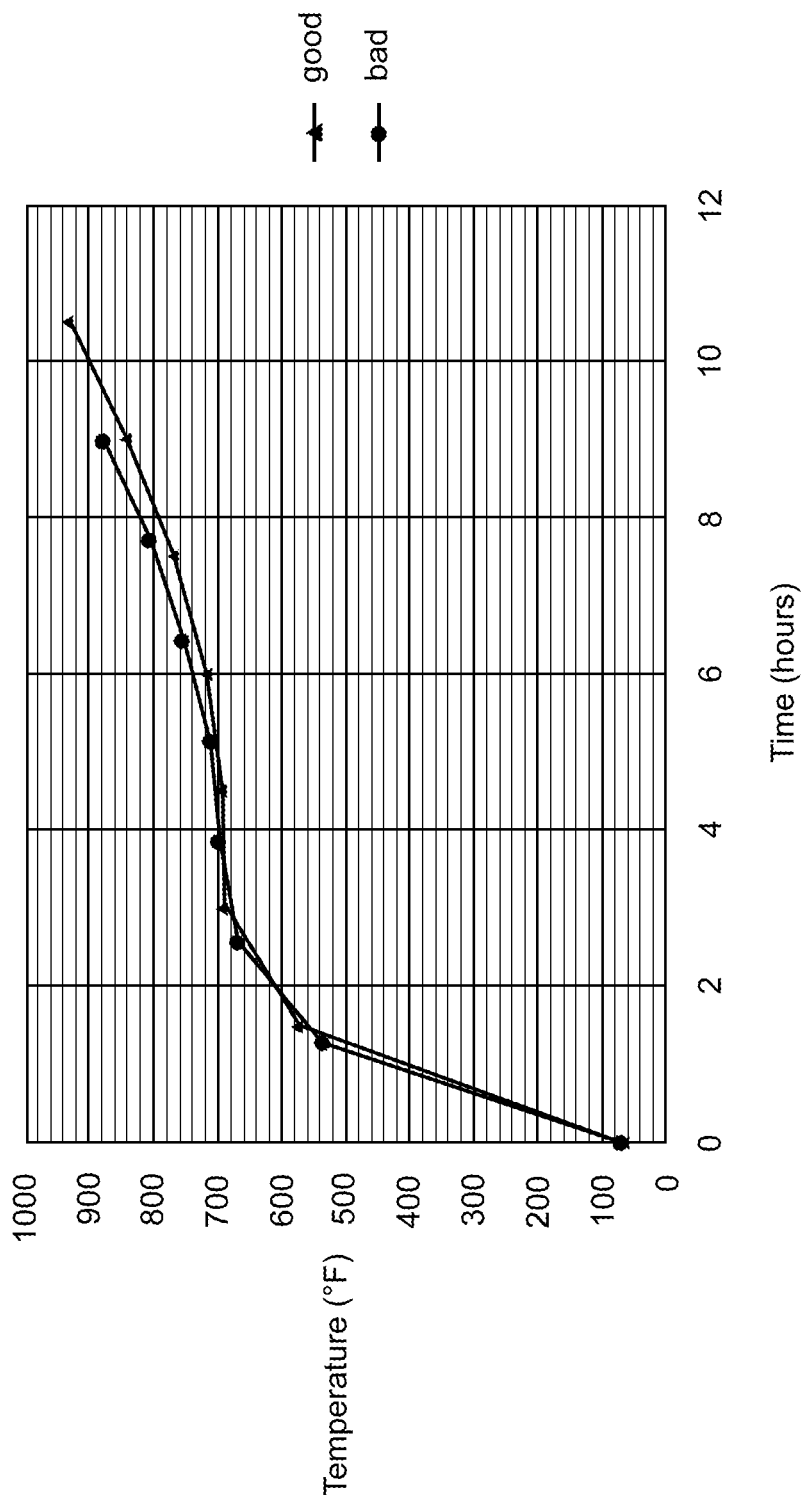
FIG. 4 is a graphical plot of two different thermal profiles utilized in the manufacture of carbon foam panels.
Figure 5:
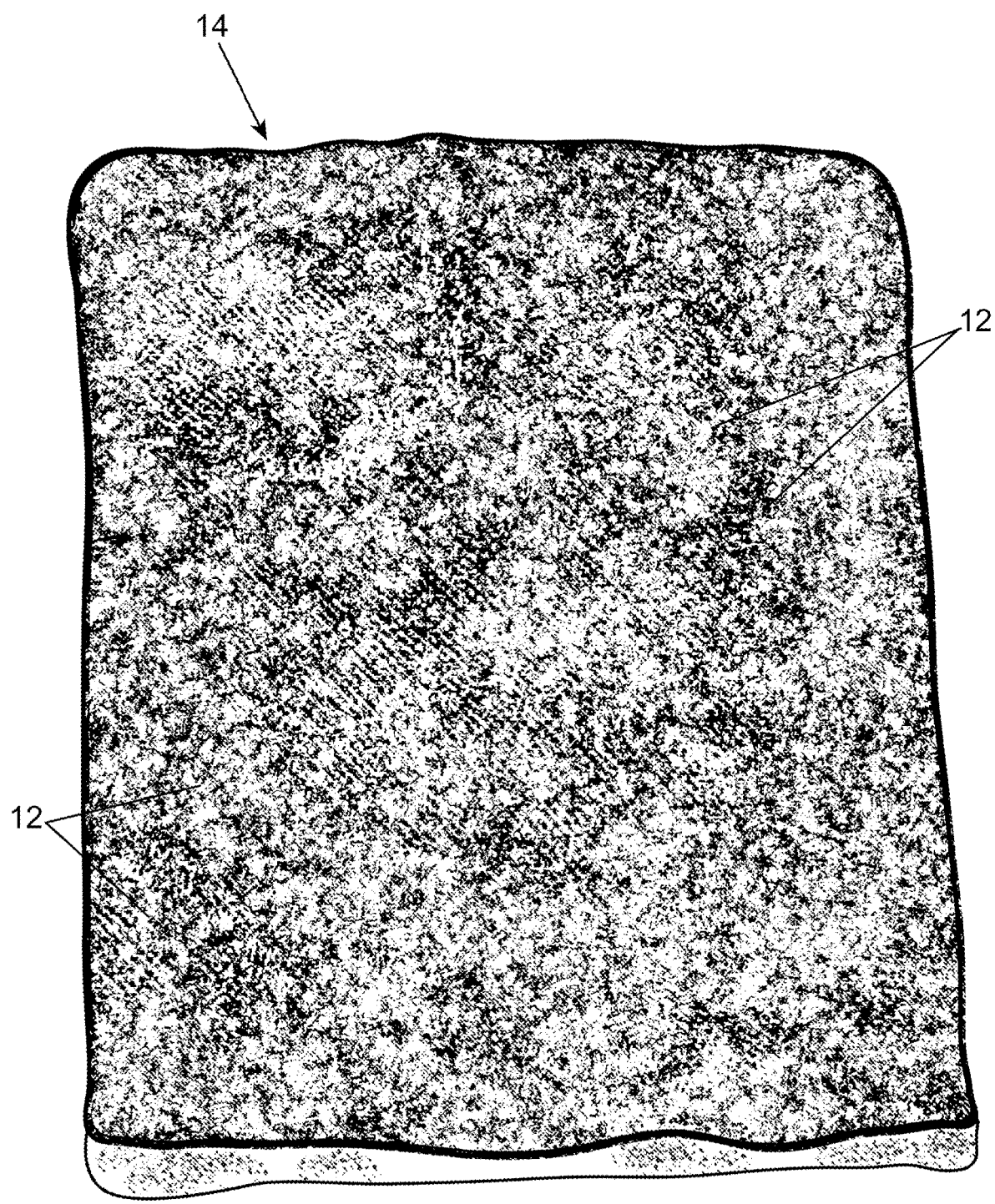
FIG. 5 is a rendering of a photograph for an essentially crack-free panel made utilizing a high vol coal containing 1-wt % polyethylene oxide, 1-wt % phenolic resin, and 4-wt % graphite in a continuous kiln using the "good" thermal profile displayed in FIG. 4.
Figure 6:
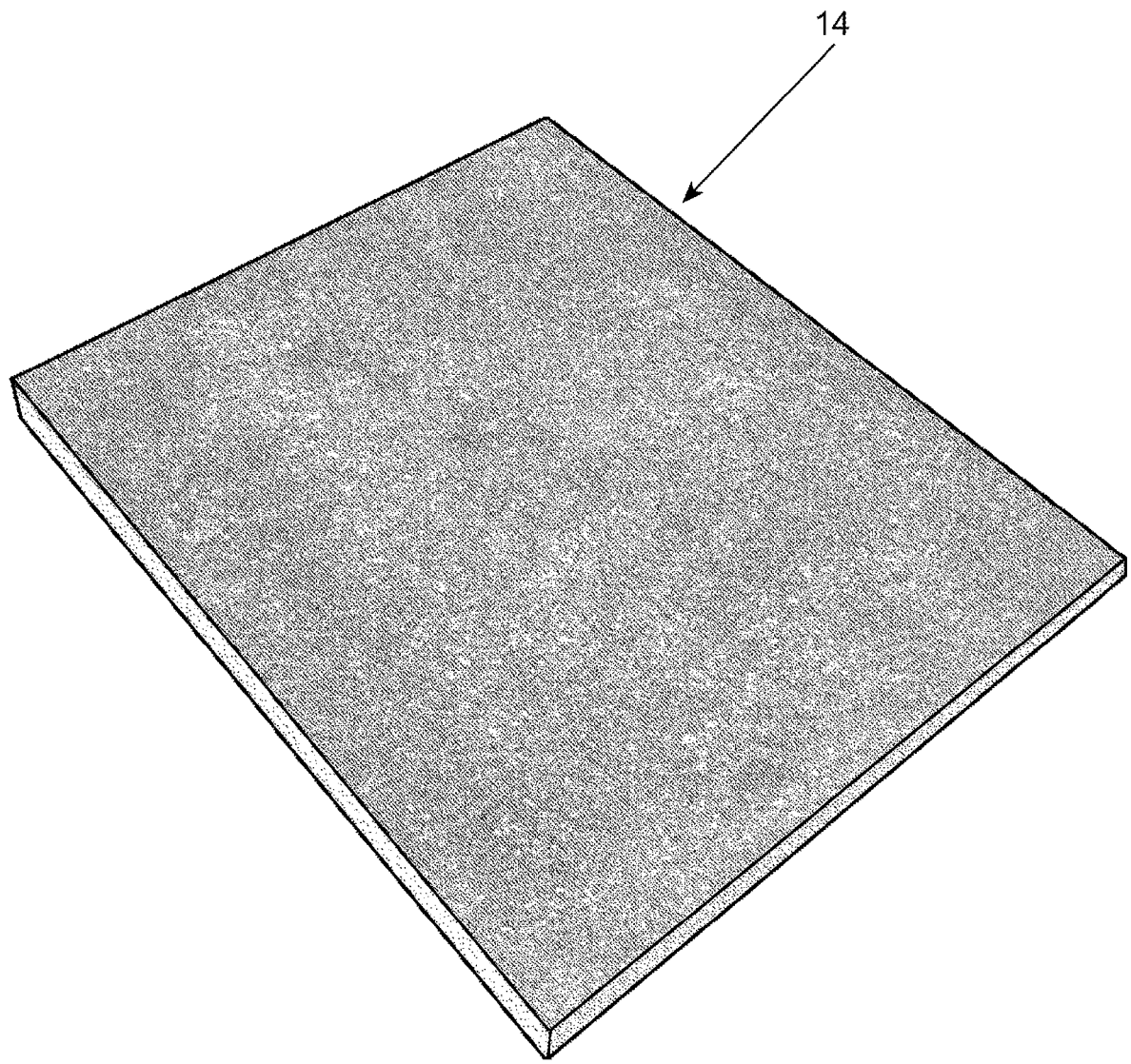
FIG. 6 is a rendering of a picture showing a carbon foam panel produced in continuous kiln at atmospheric pressure after being machined to shape of approximately 1.25"×17"× 22".

When these types of chemical or particulate additives were applied to the same coal and an acceptable thermal profile was employed, such as the "good" curve shown in FIG. 4, significantly more attractive panels with larger size, more difficult rectangular shape, and essentially crack-free foam structure were produced. The panel shown in FIG. 5 is an essentially crack-free panel made utilizing Bailey coal containing 1-wt % polyethylene oxide, 1-wt % phenolic resin, and 4-wt % graphite in a continuous kiln using the "good" thermal profile displayed in FIG. 4. This panel was approximately 19"×23" as pictured. Note the discontinuities 12 on the surface are from a sheet of paper that acts as a mold release. The panel was easily machined, as shown in FIG. 6, producing an essentially crack-free carbon foam panel 14 with smooth surfaces. This essentially crack-free carbon foam panel 14 was produced in continuous kiln at atmospheric pressure and machined to the shape of approximately 1.25"×17"×22".

The Applicants noted that a small change in the thermal profile prevented them from making essentially crack-free panels. When a very similar profile was utilized, but the maximum temperature was only 878° F. instead of 932° F., as demonstrated by the "bad" curve in FIG. 4, the panels cracked during thermal processing. The Applicants determined that the temperature difference in the thermal profile is likely the difference between the material having sufficient or insufficient strength to prevent failure due to thermal stresses. These data suggest there is a minimum temperature to which the carbon foam must be fired to ensure survival on relatively rapid cooling through the continuous process.

The initial heating rate of 6° F. per minute and the time roughly spent at 700° F., as demonstrated in the "good" curve of FIG. 4, was acceptable in producing an essentially crack-free carbon foam structure. The Applicants determined that these parameters are critical for obtaining carbon foam of essentially crack-free quality in a continuous kiln at atmospheric pressure. Initial trials utilized a heating rate of 8° F. per minute were unsuccessful in producing an essentially crack-free foam panel structure. An initial rate that is too fast or too slow, or an insufficient amount of time spent at a temperature near 700° F., will not produce foam of an essentially crack-free quality in a continuous process. Note these target values will vary slightly depending on the types of coal and chemical or particulate additives employed.

With a long enough continuous kiln, the maximum temperature and the extent to which the coal is carbonized could be increased as high as desired, assuming the container (mold) used to hold the coal has sufficient refractoriness and redox properties.

Figure 7:
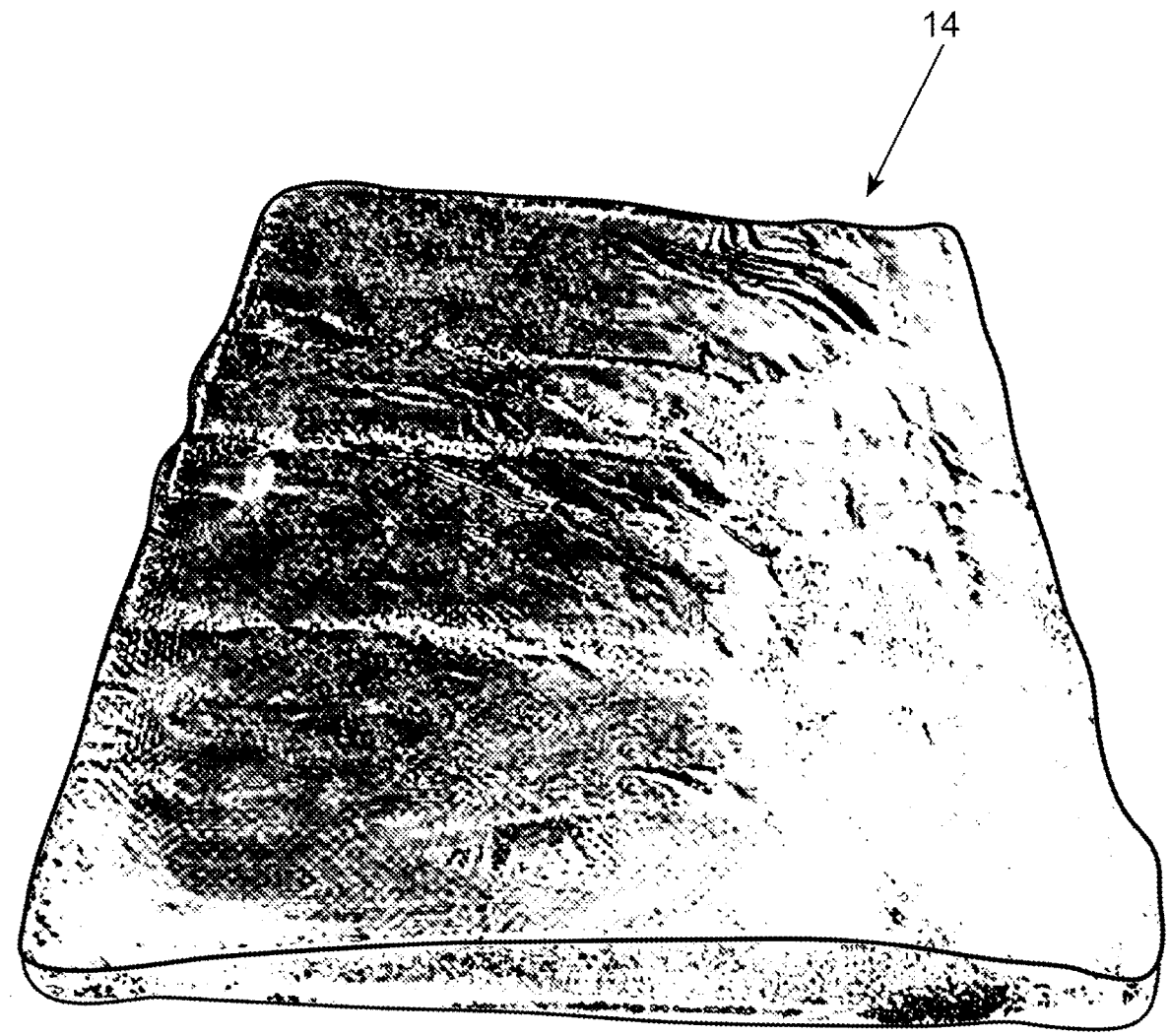
FIG. 7 is a rendering of a picture showing a carbon foam panel containing 4-wt % graphite.
Figure 8:
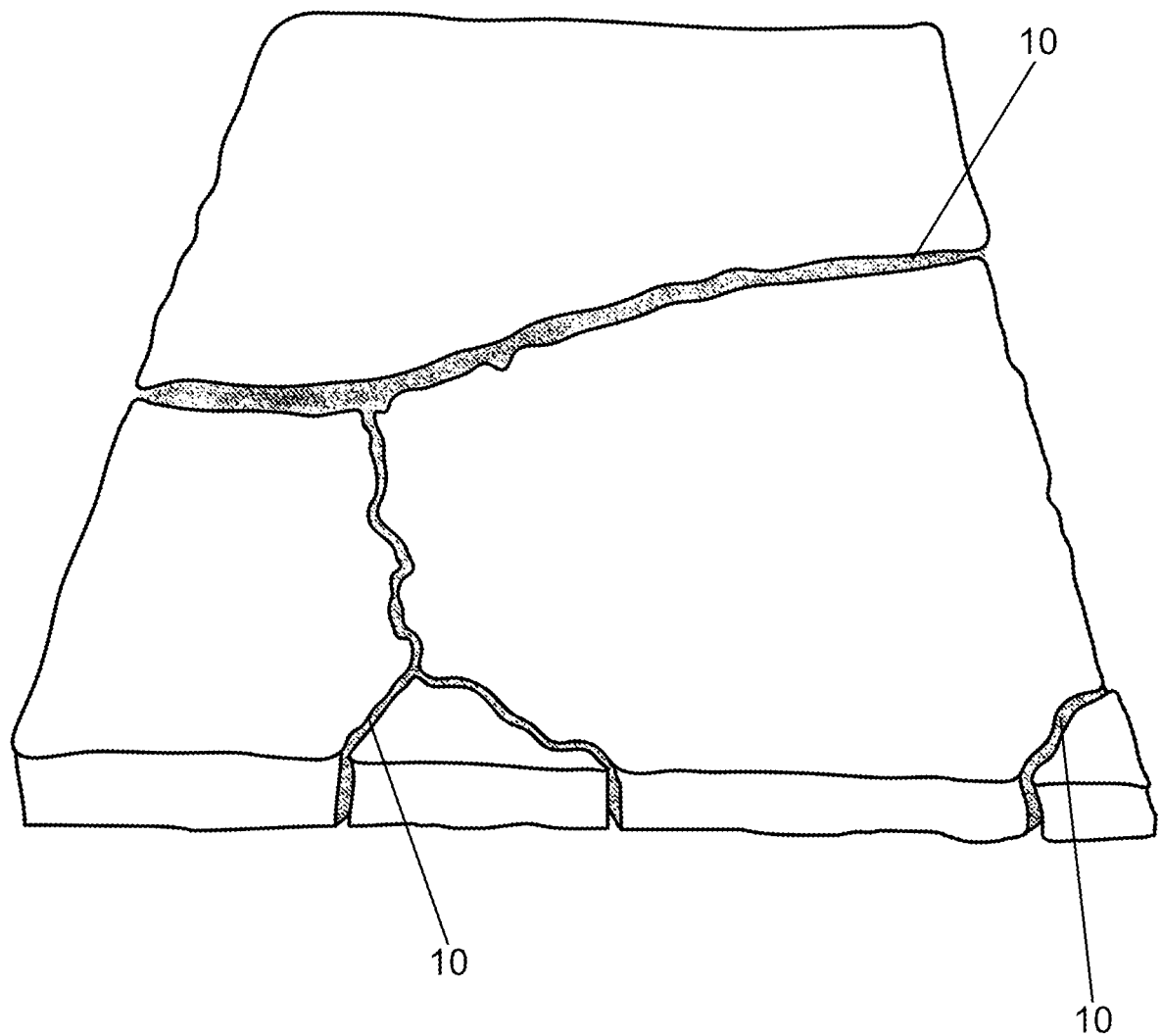
FIG. 8 is a rendering of a picture showing a carbon foam panel containing 4-wt % alumina.

The Applicants also discovered that graphite addition may be critical to producing large panels at an acceptable rate through the kiln. For the same rate, a panel containing 4-wt % of a thermally conductive graphite powder produced an essentially crack-free panel or structure, as shown in FIG. 7. Whereas the similar formulation with graphite swapped for non-thermally conductive alumina powder produced a cracked panel with numerous cracks 10, as seen in FIG. 8. The Applicants determined that the graphite helps to reduce the thermal gradient and resultant mechanical stress gradient over the panel, a phenomenon that is exacerbated by processing material through the kiln more quickly. Thus, the Applicants determined that graphite addition can increase the speed with which panels can be processed through the continuous kiln.

Figure 9:
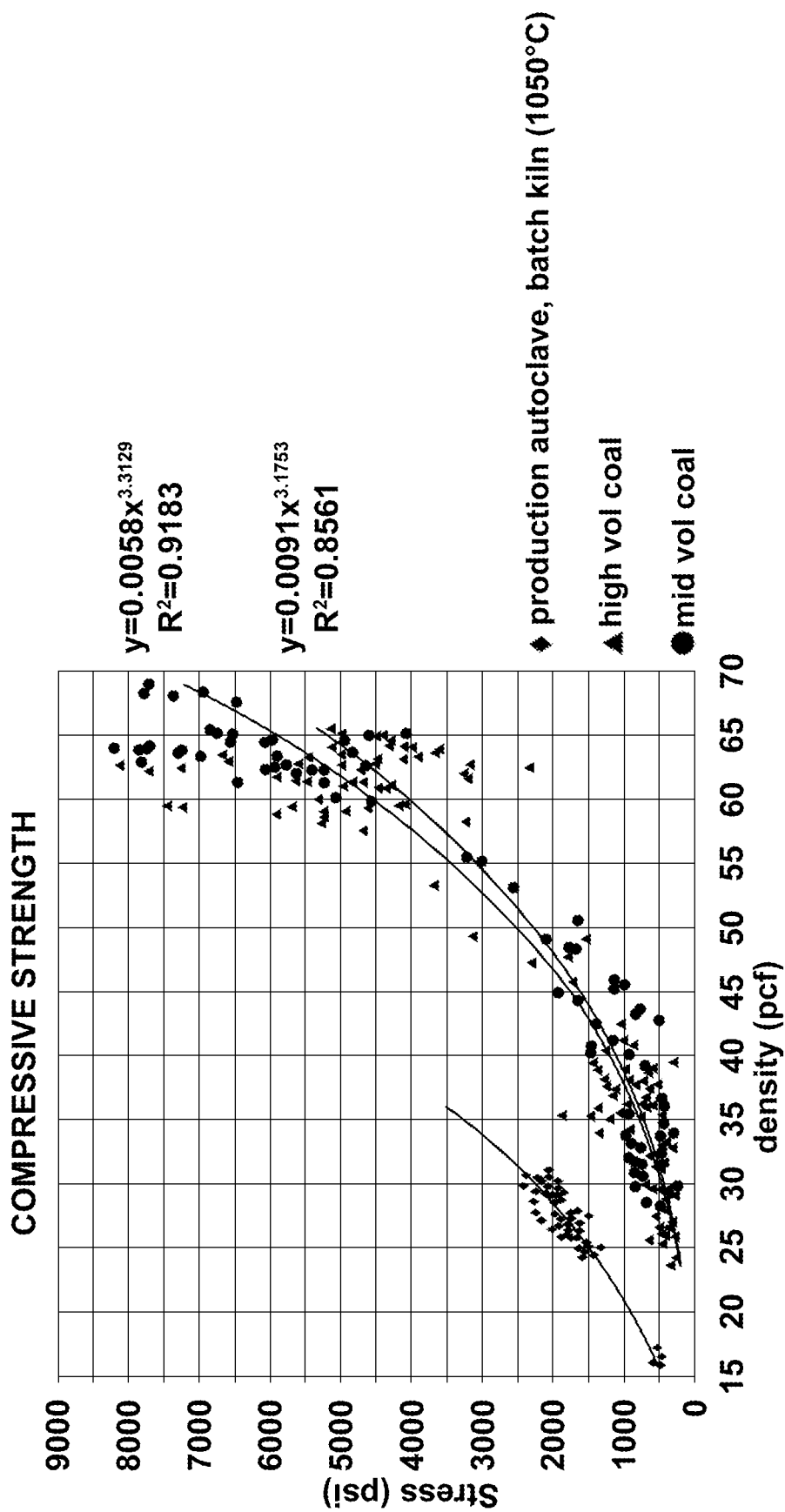
FIG. 9 is a plot of compressive strength as a function of density for carbon foam made in an autoclave versus that produced at atmospheric pressure using either a mid-volatility coal or a high volatility coal.

A method is disclosed by which carbon foam is manufactured in a continuous process at atmospheric pressure wherein the maximum temperature to which the parts are processed is high enough to provide sufficient strength to the material and also avoided cracking during the cooling process. The Applicants determined that this temperature is about 900° F. The rate at which the coal mixture is heated is about 6° F. per minute. After the coal mixture is preheated, it is allowed to sit in the kiln at about 700° F. for a period of time before temperature is increased. Graphite additive is utilized to increase the rate at which carbon foam can be processed through the continuous kiln. An essentially crack-free carbon foam structure product manufactured by this process can have a compressive strength of about 1200 psi when normalized to a density of about 40 pounds per cubic foot, as shown in FIG. 9

The foregoing explanations, descriptions, illustrations, examples, and discussions have been set forth to assist the reader with understanding this invention and further to demonstrate the utility and novelty of it and are by no means restrictive of the scope of the invention. It is the following claims, including all equivalents, which are intended to define the scope of this invention.

The invention claimed is:

1. A continuous method for producing essentially crack-free carbon foam structures, comprising the steps of:
    pulverizing a carbonaceous starting material consisting of bituminous coal. subbituminous coal, anthracitic coal, lignitic coal, and combinations thereof into a powder;
    blending the powder and at least one of a chemical or particulate additive to form a coal mixture;
    placing the coal mixture into a carbon foam structure mold configured for continuous processing in a kiln under inert gas at atmospheric pressure;
    heating the mold and coal mixture at a rate of about 6° F. per minute in a kiln temperature of about 700° F. under an inert gas;
    maintaining the kiln temperature at about 700° F. for a period of time for thermally processing the coal mixture;
    further heating the mold and coal mixture in a kiln temperature of about 900° F. until a carbon foam structure is formed; and
    cooling the carbon foam structure at atmospheric conditions;
    wherein the carbon foam structure has a compressive strength of less than 2000 psi or 13.8 MPa, a density of less than 50 pounds per cubic foot or 0.8 grams per cubic centimeter and is essentially crack-free.

2. The method of claim 1, wherein the blending step further comprises, adding a particulate pore stabilizer to the carbonaceous starting material.

3. The method of claim 2, wherein the particulate pore stabilizer comprises carbon black, fine oxides of alumina, silica, boric acid, titania, aluminosilicate clay, kyanite, fine non-oxide powders of silicon carbide, metal powders, and mixtures thereof.

4. The method of claim 1, wherein the chemical or particulate additive comprises at least one of polyethylene, polyethylene oxide, phenolic resin, microcrystalline cellulose, graphite, and mixtures thereof.

5. The method of claim 1, wherein the period of time is in the range of about 0.5 hours to about 12 hours.

6. An essentially crack-free carbon foam structure made by a continuous method, comprising the steps of:
   pulverizing a carbonaceous starting material consisting of bituminous coal. subbituminous coal, anthracitic coal, lignitic coal, and combinations thereof into a powder;
   blending the powder and at least one of a chemical or particulate additive to form a coal mixture;
   placing the coal mixture into a carbon foam structure mold configured for continuous processing in a kiln under inert atmosphere at atmospheric pressure;
   heating the mold and coal mixture at a rate of about 6° F. per minute in a kiln temperature of about 700° F. under an inert gas;
   maintaining the kiln temperature at about 700° F. for a period of time for thermally processing the coal mixture;
   further heating mold and coal mixture in a kiln temperature of about 900° F. until a carbon foam structure is formed; and
   cooling the carbon foam structure at atmospheric conditions;
   wherein the carbon foam structure has a compressive strength of less than 2000 psi or 13.8 MPa, a density of less than 50 pounds per cubic foot or 0.8 grams per cubic centimeter and is essentially crack-free.

7. The essentially crack-free carbon foam structure of claim 6, wherein the blending step further comprises, adding a particulate pore stabilizer to the carbonaceous starting material.

8. The essentially crack-free carbon foam structure of claim 7, wherein the particulate pore stabilizer comprises carbon black, fine oxides of alumina, silica, boric acid, titania, aluminosilicate clay, kyanite, fine non-oxide powders of silicon carbide, metal powders, and mixtures thereof.

9. The essentially crack-free carbon foam structure of claim 6, wherein the chemical or particulate additive comprises at least one of polyethylene, polyethylene oxide, phenolic resin, microcrystalline cellulose, graphite, and mixtures thereof.

10. The essentially crack-free carbon foam structure of claim 6, wherein the period of time is in the range of about 0.5 hours to about 12 hours.

\* \* \* \* \*

UNITED STATES PATENT AND TRADEMARK OFFICE
CERTIFICATE OF CORRECTION

| | |
|---|---|
| PATENT NO. | : 12,264,109 B1 |
| APPLICATION NO. | : 18/838514 |
| DATED | : April 1, 2025 |
| INVENTOR(S) | : Rudolph Andrew Olson, III et al. |

It is certified that error appears in the above-identified patent and that said Letters Patent is hereby corrected as shown below:

In the Specification

On Column 4, Lines 59-62, should read as shown in the following paragraph:
The particulate pore stabilizer may be added in amounts ranging from about 0.1% to about 10% by weight. In certain embodiments, the particulate pore stabilizer may be added in amounts less than about 1% by weight. In some embodiments, the majority of the particle sizes in the particulate pore stabilizer are preferably less than 10 μm. Preferably, the particle sizes are less than about 5 μm. In some embodiments, the particle sizes in the particulate pore stabilizer may range from about 3 to about 4 μm.

Signed and Sealed this
Twentieth Day of May, 2025

Coke Morgan Stewart
*Acting Director of the United States Patent and Trademark Office*